July 1, 1930.  F. J. OVEN  1,768,995
GASKET
Filed April 17, 1925
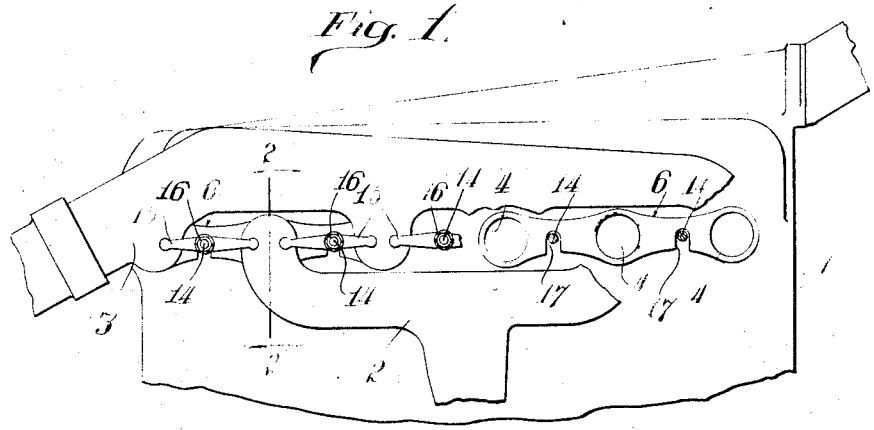
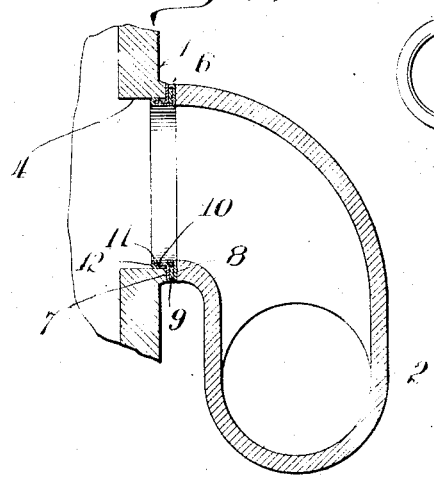
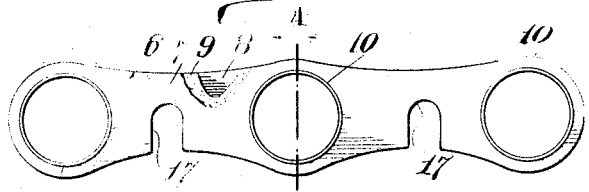
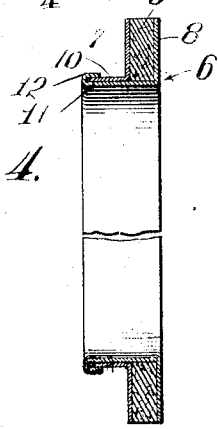
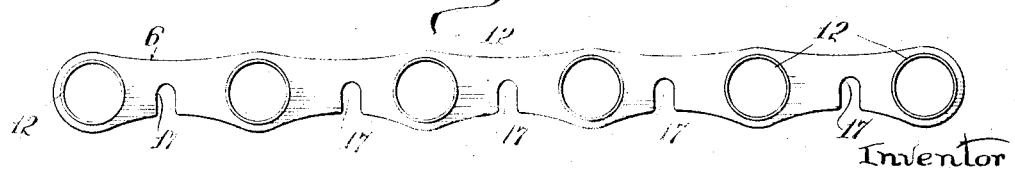
Inventor
Frank J. Oven
by Daniel J. Brennan.
Attorney Patented July 1, 1930

1,768,995

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

GASKET

Application filed April 17, 1925. Serial No. 23,866.

This invention relates to improvements in gaskets, as for instance gaskets used in connection with combustion engines.

It is an object of the invention to provide a gasket composed of metallic layers and having openings with flanges projecting from the plane of the gasket.

It is also an object of the invention to provide a gasket in which this flange is formed by firmly uniting portions of the inner and outer layers mechanically without necessarily resorting to heat or chemical agencies.

Another object of the invention is to provide in a gasket a circular flange by bending cylindrical portions out of the layers and forcing the inner one of these cylindrical portions of which the complete flange is composed—at its outer edge over the outer edge of the other cylindrical portion.

Another object of the invention is to provide a gasket which can be inserted in place or removed from the place of use without requiring a complete removal of the holding devices, the openings for the holding elements being formed as elongated recesses terminating in an edge of the gasket instead of being formed as holes through which holding means extend.

With these and numerous other objects in view, embodiments of the invention have been described in the following specification, and the various features are pointed out in the appended claim.

In the drawings:

Fig. 1 is a side elevation of a portion of an internal combustion engine, certain parts being shown broken away to show a gasket in place;

Fig. 2 is a detail, sectional view on a larger scale, on line 2—2 of Fig. 1;

Fig. 3 is a side elevation of a gasket;

Fig. 4 is a sectional view through the same on line 4—4 of Fig. 3, on a larger scale, and Fig. 5 is a front elevation of a modified form of the gasket.

The combustion engine 1 may be provided with a multiple inlet 2 and a multiple exhaust 3, portions of which are indicated. The openings for these inlet and outlet conduits of the engine preferably are at about the same level, the conduits being in communication with these openings 4 under interposition of gaskets 6. The gaskets 6 used for this purpose are preferably made of very thin inner and outer layers 7 and 8 of extremely flexible, thin metal, the two layers 7, 8 being separated from each other by one or a plurality of layers 9 of asbestos or some similar heat insulating material.

For the purpose of effectively sealing the joint between the conduits 2, 3 and the casting 1 at the openings 4, the gaskets 6 are provided with flange structures 10 which reinforce the gasket itself and which project into the openings 4.

Heretofore flange structures were formed by shaping the marginal portion of one layer of the gasket into a cylindrical flange and bending this flange back on itself so as to produce a cylindrical flange composed of two layers, and then forcing the margin of this flange against the opposite layer about the edge of the opening. In this arrangement, it was necessary to anneal the marginal portion, otherwise it would slit. The slitting naturally decreased the holding power of the bent portion, while annealing weakened the portion to such an extent that the flange, intended to act as a reinforcement, was too weak to be used for this purpose.

According to Figs. 2 and 4 of the present application, each of the levers is formed into a cylindrical flange 10 and 11, and these flanges are inserted one in the other to engage each other over their entire circumferential length, the free marginal portion of the inner flange 11 being bent or spun about the outer edge of the other flange 10 so as to form a reinforcing bead 12 for the flange structure at the free edge of the same. Even if it should be necessary to slit the bent over portion of the cylindrical flange 11, this slitting would have no detrimental effect, since the entire flange is fitted into the opening 4 of the engine casting to which the gasket is to be applied.

The multiple conduits 2, 3 of the combustion engines on which these gaskets are used frequently are held in position on the casting by bolts or screws 14 threaded into the material of the casting and loosely carrying arms 15 which act on the conduits 2, 3 to press these conduits firmly into engagement with the gaskets by means of prongs, the arms 15 placed on the screws 14 being secured in position by means of nuts 16. In order to exchange a defective gasket, it was necessary in former constructions to loosen the nuts 16 and remove the arms 15 as well as the conduits so that the gaskets could be shifted over the outer end of the holding screws.

The present invention renders this complete removal of the holding nuts and prongs as well as the complete separation of the conduits and engine castings dispensable, as the openings for the holding screws 14 in the gaskets are not formed by circular openings but by elongated recesses 17 or cut-out portions extending from a point on the longitudinal axis of the gasket transversely thereof to the longitudinal edge of the same. It is, therefore, only necessary to loosen the nuts 16 and the holding prongs 14 and to shift the conduits 2, 3 sufficiently to leave clearance for the thickness of the gaskets and flanges, whereupon the defective gasket may be slipped out by shifting it transversely to the axis of the holding screws 16, and in a similar way the installation of a new gasket may be completed.

Dependent upon the size of the engine or upon the desire of the manufacturer, gaskets of this nature can be made to accommodate any desired number of openings 4. In Fig. 2 a gasket having three of these reinforced openings provided with cylindrical flange structures is shown, while Fig. 5 discloses a gasket having six of these openings and being also provided with cut-out portions 17 between each two of the flanged openings. The removal of this metal gasket rendered flexible and heat resisting through the insertion of sheet asbestos or the like also can be effected by merely loosening the holding prongs 14 and then shifting the entire gasket upward transversely to the axis of the holding screws, as will be readily understood by a reference to Fig. 1 of the drawings near the right hand end of the same.

I claim:

A gasket, having inner and outer metal layers and a non-metallic layer inserted between them, the layers being provided with circular openings in register with each other, the inner and outer metallic layers each being provided with a flange deflected from the plane of the respective layer in the same direction, the margin of the inner flange being bent over the edge of the outer flange and being pressed against the same.

In testimony whereof I affix my signature at 10 South La Salle Street, Chicago, Illinois.

FRANK J. OVEN.